Sept. 12, 1961 J. W. CHALMERS ET AL 2,999,345
APPARATUS FOR FOLDING FLEXIBLE WRAPPERS
ABOUT RECTANGULAR BLOCK-SHAPED ARTICLES
Filed March 1, 1960 7 Sheets-Sheet 1

INVENTORS
John W. Chalmers
Charles T. Hall
William A. Roffey
BY
Watson, Cole, Grindle & Watson
ATTORNEYS Sept. 12, 1961 J. W. CHALMERS ET AL 2,999,345
APPARATUS FOR FOLDING FLEXIBLE WRAPPERS
ABOUT RECTANGULAR BLOCK-SHAPED ARTICLES
Filed March 1, 1960 7 Sheets-Sheet 4

INVENTORS
John W. Chalmers
Charles T. Hall
William A. Roffey
BY
Watson, Cole, Grindle & Watson
ATTORNEYS

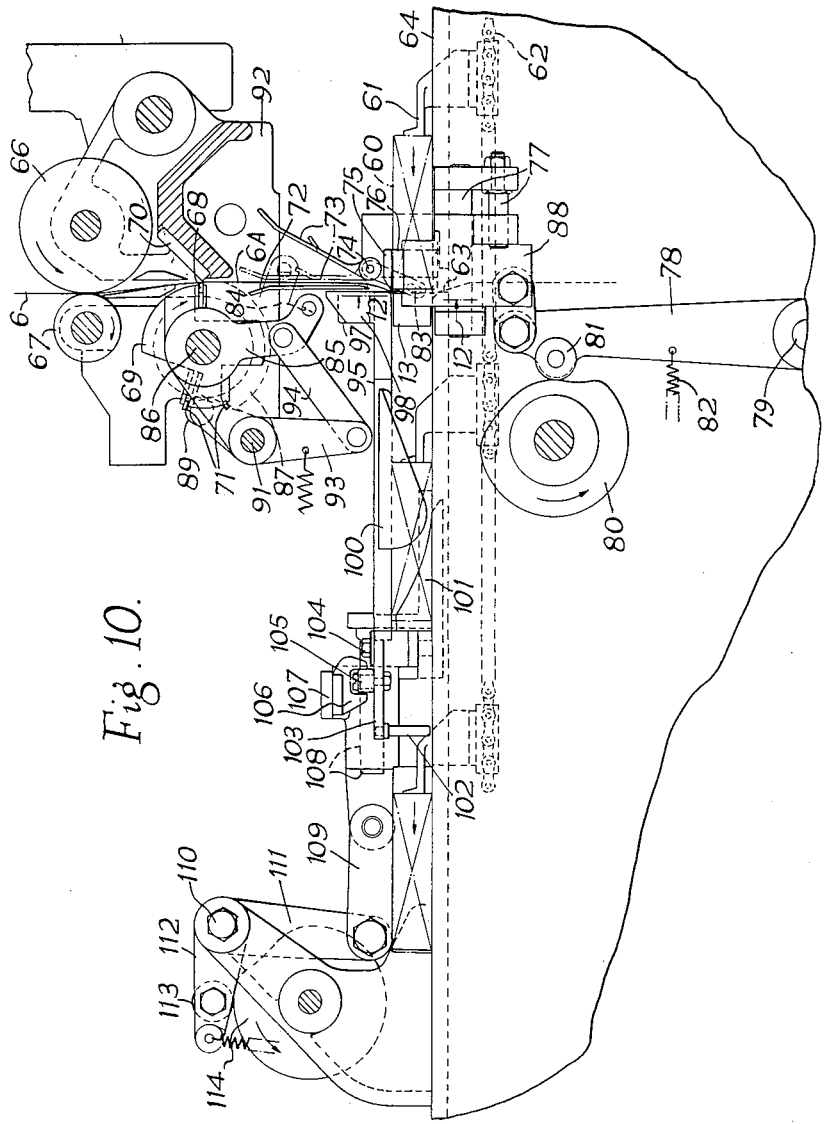

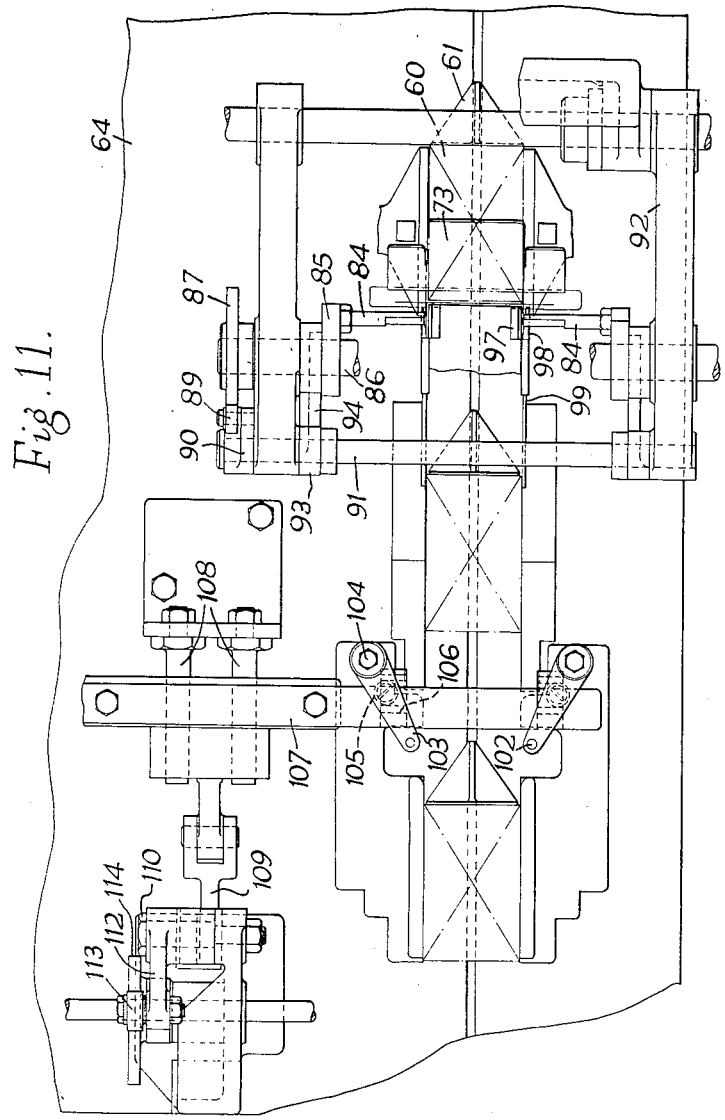

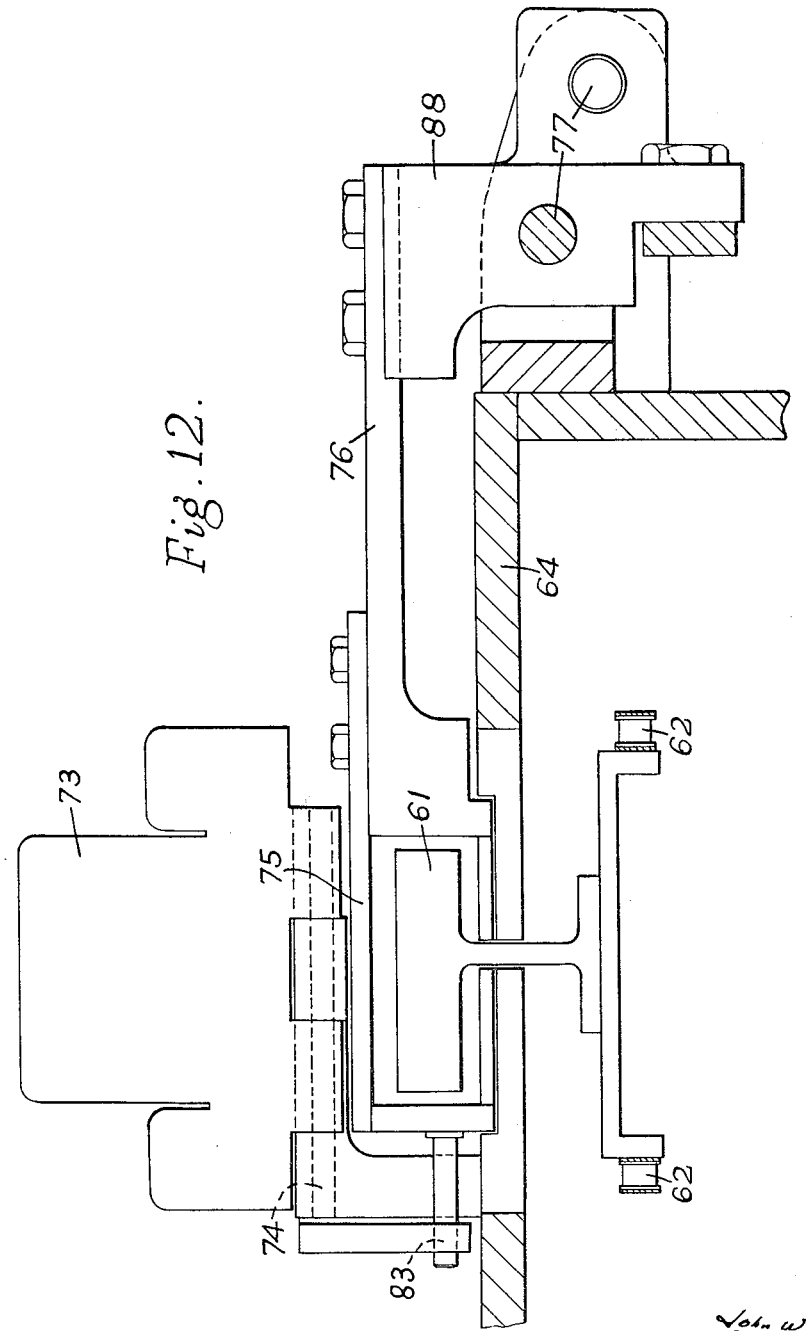

United States Patent Office

2,999,345
Patented Sept. 12, 1961

2,999,345
APPARATUS FOR FOLDING FLEXIBLE WRAPPERS ABOUT RECTANGULAR BLOCK-SHAPED ARTICLES
John Walker Chalmers, Charles Thomas Hall, and William Arthur Reffey, all of Deptford, London, England, assignors to Molins Machine Company Limited, London, England, a British company
Filed Mar. 1, 1960, Ser. No. 12,215
Claims priority, application Great Britain Mar. 17, 1959
9 Claims. (Cl. 53—230)

This invention concerns apparatus for folding flexible wrappers about rectangular block-shaped articles and is mainly, though not exclusively, directed to the wrapping of a batch of rod-shaped articles, such as cigarettes in a wrapper of flexible material. It will be appreciated that a batch of cigarettes approximates to a rectangular block when assembled ready for wrapping and the term "rectangular block" includes such a batch.

In the copending U.S. application Serial No. 7,052, filed February 5, 1960, there is described a method of wrapping a batch of rod-shaped articles in metal foil or paper and the apparatus of the present invention is for carrying out that method.

According to the invention there is provided apparatus for wrapping rectangular block-shaped articles by moving an article against a wrapper blank, provided with pairs of slits at each side spaced apart by the article thickness and which is positioned in the path of the article, whereby the blank is first folded into a U about the article by being moved between plates spaced apart by the article thickness, wtih the base of the U extending substantially between said slits, said apparatus comprising a guide channel for the blank to lead it into position in the path of the article, a finger movable at each side of the blank to bend the portion of blank material between the slits at that side through an angle in the direction of movement of the article, guides to retain the bent portions in bent position and folding devices arranged, on continued movement of the article, to fold the blank into the said U and thereafter to fold the material extending laterally of the top and bottom faces of the article to form long side folds along the sides of the article.

The fingers may be moved to bend the said portions at 90° to the plane of the blank, in which case the said guides may consist of spaced plates to define slots parallel to the direction of movement of the article and arranged to receive said portions. Alternatively the fingers may bend the said portions to an angle less than 90° and the guides may comprise helical or equivalent folders to continue the bending of said portions until they are at 90° to the plane of the blank and said folders operating as the blank continues to move to the position in the path of the article. The bent portions can be folded on to the sides of the partly wrapped article after the first, or after both, long side folds have been made, as may be desired, and devices for folding the bent portions may comprise rollers or the like positioned in the path of a partly-wrapped article so that the bent portions pass on the outside of the rollers whereafter the rollers move aside as the partly-wrapped article passes and said rollers fold the bent portions on to the sides of the partly wrapped article by causing them to rotate through 180° and thus reverse their direction.

In one construction the guide channel may comprise two plates spaced apart to permit the blank to pass between and the plate in front of that face of the blank with which the article first engages may be substantially of the width of the blank, in which case it has opposed slots at its sides through which said fingers may pass to engage the blank material, while the other plate may be of a width not exceeding the width of the article.

In a modified construction the plate in front of the blank may be movable to permit fingers to pass to a position in front of the blank path and in that case the other plate may be of blank width and slotted to permit the fingers to pass.

The said rollers may be operated by cam or like mechanism, or they may be sprung so that they can be pushed aside by the article and so as to roll on the outside of the partly-wrapped article and thus cause the bent portions to move through 180°.

Preferably the folding devices for the long side folds comprise fixed ploughshare folders.

Since most articles wrapped as recited above are completely enclosed in wrapping material, the rear ends of the wrapper will extend beyond the rear face of the article and if the sprung rollers referred to are employed they will crumple the extending part of the wrapper. To prevent this, means are provided to hold the rollers in their out position until an article and its wrapper have passed beyond the rollers whereafter the holding means is released to permit the rollers to move once more into the path of article movement.

Apparatus made in accordance with the invention will be described by way of example with reference to the accompanying drawings, in which:

FIGURE 2 is a partial end view of FIGURE 2 in the direction of arrow A;

FIGURE 10 is a side elevation of a modified construction, partly in section;

FIGURE 11 is a plan of FIGURE 10, with some parts broken away;

FIGURE 12 is a sectional view on the line 12—12, FIGURE 10.

Figure 1:
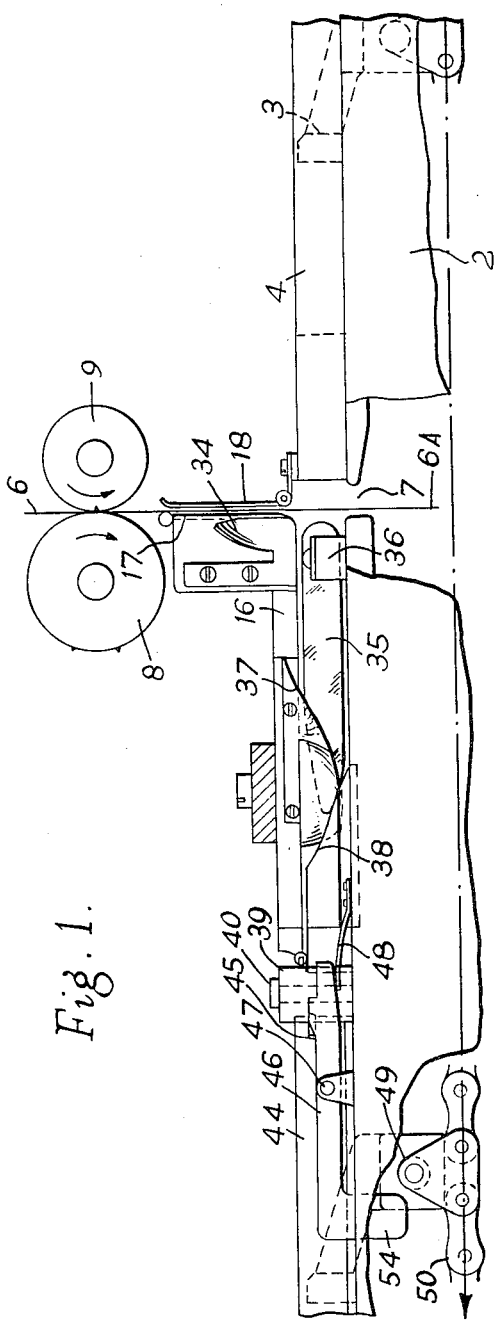
FIGURE 1 is a side elevation of part of a wrapping machine embodying the apparatus, and partly broken away.
Figure 2:
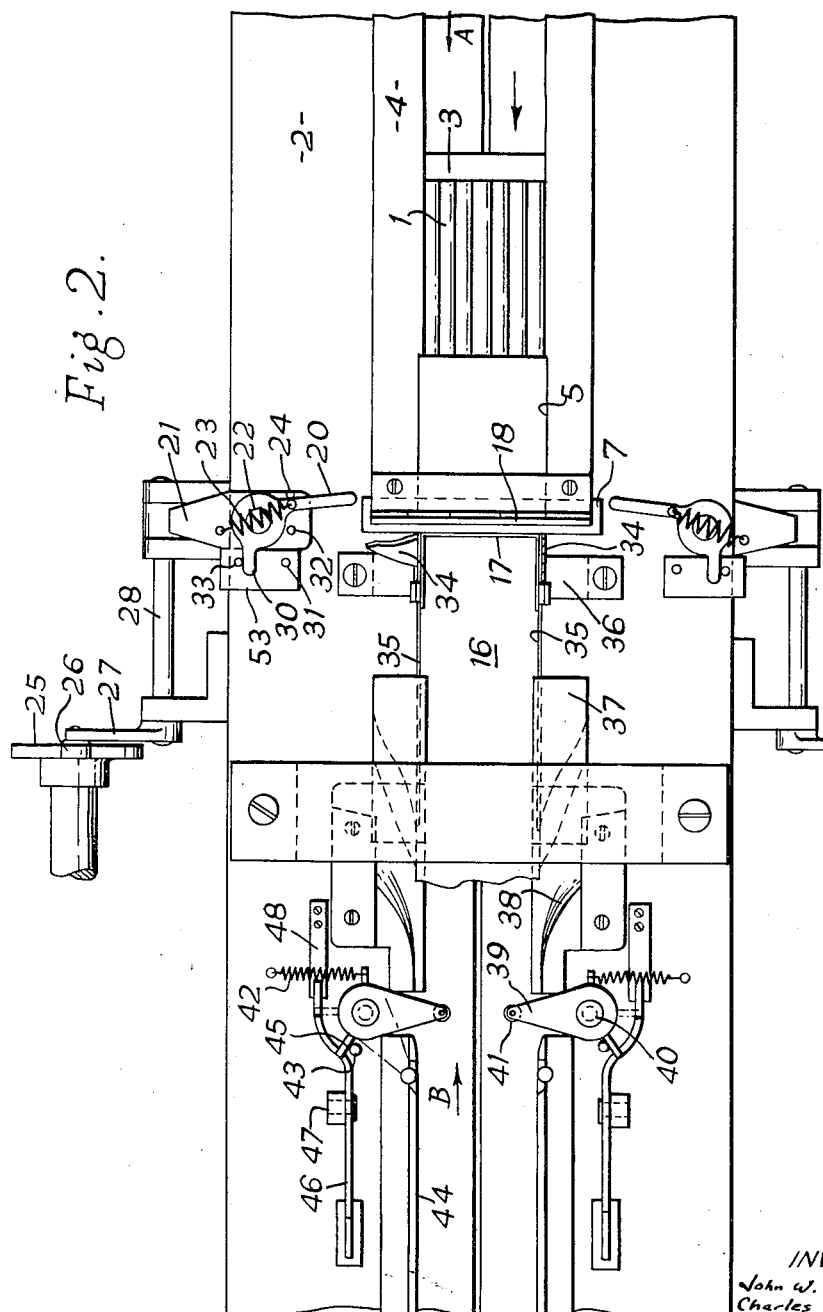
FIGURE 2 is a plan of FIGURE 1.
Figure 3:
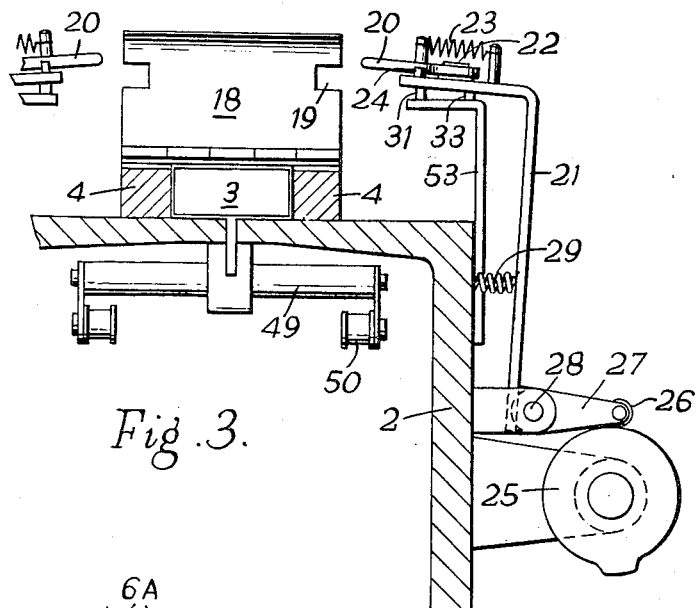
Figure 4:
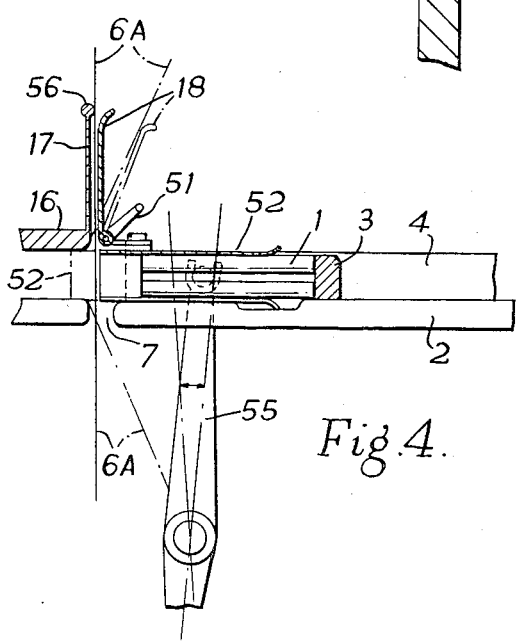
FIGURE 4 is a diagram of part of the apparatus omitted from the other views.
Figure 5:
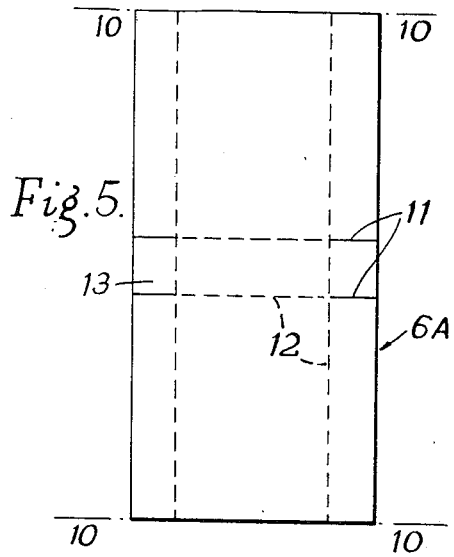
FIGURES 5 to 8 show stages of the wrapping operation.
Figure 6:
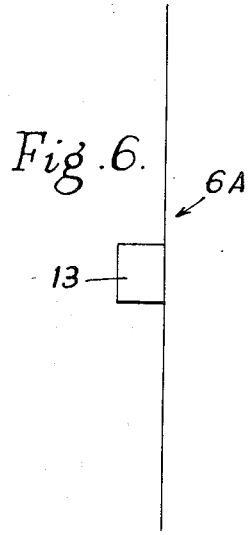
Figure 7:
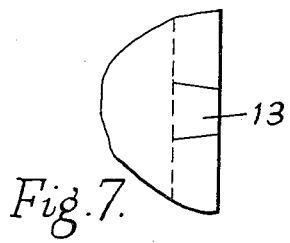

Referring to FIGURES 1 to 3 of the drawings a batch 1 of cigarettes is moved along a machine bed 2 by a pusher 3 which is one of a number attached to a conveyor chain 50, FIGURE 1. The batch moves between guides 4 which are recessed at 5 (FIGURE 2) to form a rather wider channel for reasons explained later with reference to FIGURE 4. Metal foil is fed as a web 6 from a reel (not shown) to pass vertically downwards through a slot 7 in the machine bed. When a sufficient length for wrapping a batch has been fed a strip or blank 6A is cut from the web by a transverse cutter in a cutting roller 8 and during the feeding of the piece which will form the blank two short slits are made at each side by suitable knives on the roller 8, cutting being effected against a pressure roller 9. In FIGURE 1 the knives are indicated by three small triangles on the roller 8. The resulting blank is shown in FIGURE 5 where the cutting lines are marked 10 and the side cuts 11, the broken lines 12 representing the fold lines formed when the foil is wrapped about the cigarette batch. If desired the short slits may be arranged as shown in FIGURE 7 as this makes slitting and folding easier. The short slits provide partly detached pieces 13 which eventually form the narrow side tucks at the base of the package formed by the wrapping operation, Referring now to FIGURE 8 it is desired to fold the parts marked 14 and 15 first to form the long side folds of the package whereafter the side tucks 13 are folded back on to the package, all for reasons given in the specification referred to.

When the wrapper blank 6A is in position as shown in FIGURE 1 the cigarette batch moves into contact with it and by carrying it between the machine bed and a top plate 16 the blank is formed into a U about the batch. Later the material extending beyond the sides of the batch is folded to make the long side folds in a manner described later and for this purpose it is desired to use fixed ploughshare folders of a kind common in the art. It is therefore necessary to handle the side tuck material so that it does not extend laterally of the batch or it will be crumpled by the fixed folders and as previously noted it is desired to fold the side tucks as a final operation.

Means are therefore provided to bend the two pieces of material 13 so that one piece lies in the plane of each side of the batch, and also so that it is in advance of the leading end of the batch. As the web is fed downwards it passes between guide plates 17 and 18, the plate 17 being fixed to the top plate 16 and the plate 18 being hinged as shown in FIGURE 1 to the guides 4. Hinging is desirable for reasons given later when FIGURE 4 is described.

Referring now to FIGURE 3 the plate 18 has two wide slots 19 in it and these are provided to enable fingers 20 to pass through and bend the pieces of material 13 at right angles to the plane of the blank and so that they extend forwards therefrom in the direction of movement of the batch. It will be understood that the web moves continuously and therefore the fingers are operated to give a kind of flicking motion, as will now be described. Each finger is pivoted at the top of a bent arm 21 at 22 and when the arm is in the position shown in the drawings the finger is held by an over-centre spring 23 (shown in chain lines in FIGURE 2) against a stop 24. A cam 25 engages a roller 26 on a lever 27 fixed to a pivot shaft 28 to which the arm 21 is also fixed and periodically moves the arm inwards against the action of a spring 29. As the arm moves inwards a lever 30 integral with the finger 20 strikes against a stop 31 and the finger 20 swings on its pivot and the spring 23 rides over the centre and sharply swings the finger 20 to cause it to pass through the slot 19 and bend the side tuck material through a considerable angle. Finger movement is check by another stop 32 and on the outward movement of the arm 21 the finger is brought back to the position shown as the lever 30 strikes a stop 33, and the spring 23 once more crosses the centre. The stops 31 and 33 are fixed on a bracket 53. Immediately below the slots are fixed helical folders 34 and, as the web is moving, the bent pieces 13 are caught on the inner faces of these folders and bent at right angles to the plane of the blank. Thin metal tongues 35, drawn as single lines, in FIGURE 2, are fixed at 36 so as to lie substantially flush with the inner faces of the folders 34 and thus the bent pieces 13 contact the inner faces of these tongues as a partly folded batch moves along. In FIGURE 2, one folder 34 is shown cut away and it will be seen that there is a narrow space between the folder and the side web of the guide 17. The piece 13 passes through this space and is thus on the inner face of the tongue 35.

The batch first encounters fixed ploughshare folders 37 which fold the laterally extending material at the top face of the batch through 90° to form the long side folds 14 and then other ploughshare folders 38 fold up the laterally extending material at the bottom face of the batch through 90° to make the long side folds 15.

Just beyond the ends of the folders 38 there are provided devices for bending the side tuck material through 180° so as to cause it to lie on the outside of the long side folds just mentioned. These devices comprise levers 39 pivoted at 40 and carrying downwardly projecting rollers 41 at their free end. Springs 42 normally hold the levers against stops 43 but as a partly wrapped batch moves into contact with the rollers 41 it turns the levers on their pivots against the influence of the springs 42.

Figure 9:
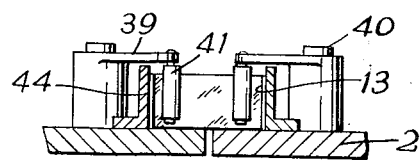
FIGURE 9 is a sectional diagram in the direction of the arrow B, FIGURE 2.

It will be seen from FIGURE 1 and from the diagram FIGURE 9 that the tuck material being located at the sides of the batch and in advance thereof will pass on the outer sides of the rollers 41 and continued movement of the batch will eventually bring the inner sides of the rollers flush with faces of guides 44. The tuck material is therefore rolled on to the surface of the long side tucks, having been reversed through 180° by the action of the the rollers 41.

Usually a metal foil wrapper when thus folded into a cup-like form about a batch extends beyond the rear face of the batch and the extending material is eventually folded down on to said rear face. It will be seen therefore that without further control the rollers 41 could easily crumple this extending material. To avoid this the levers 39 are provided with pins 45 or the like to act as stops by engaging stop levers 46 pivoted at 47 and urged upwards at the end near the levers 39 by flap springs 48. In action the pins 45 ride over curved parts of the levers, see FIGURE 1, and depress them and as soon as the pins pass beyond ledges near the ends of the levers the latter spring up and hold the pins by the ledges so that the rollers 41 stay in their outer position until a batch has completely passed the rollers. The levers 46 are swung on their pivots by engagement of their forward ends 54 to release the levers by any suitable arrangement. Tripping is conveniently effected by an attachment to the pusher which conveys the batch, see FIGURE 1, where tripping is caused by a rod 49 which holds a pusher on the conveyor chains 50. Ordinarily there is plenty of room between pushers for this action but any other suitably timed tripping device may be used.

Reference was made earlier to the recesses 5 and the hinging of the guide 18. It is very important where cigarettes are being wrapped by being pushed against wrapping material, to avoid injuring the ends of the cigarettes and with the high operational speeds now employed every precaution must be taken to avoid this. If, referring to FIGURE 1, both foil guides 17 and 18 are fixed it will be seen that there is some restraint on the upper part of the foil which has to turn through a right angle as the U forms. The guide 18 is therefore hinged and immediately it has served its purpose in guiding the foil into position it is rocked backwards away from the guide 17 as indicated in chain lines, FIGURE 4, so as to give the foil freedom of movement. The movement is effected in any convenient way. In FIGURE 4 a lever 51 is attached to the guide 18 and this can be oscillated by a cam rod (not shown).

It will also be understood that the impact of the batch against the foil might injure the ends of the cigarette and preferably the batch passes into a reciprocating metal sleeve 52, FIGURE 4, made of extremely thin metal, just as it is about to meet the foil. The sleeve, which is slotted at the bottom for the pusher to pass through, takes the impact and defines the fold lines and then retreats to permit the batch to continue the folding operation. It is to accommodate this sleeve that the guides 4 are recessed at 5. As shown in FIGURE 4 the sleeve is reciprocated by a lever 55 and in its forward movement reaches a position marked by a chain line. As the guide 17 is narrower than the web, its width may be increased above the slots 19 by a rod or like 56.

Figure 8:
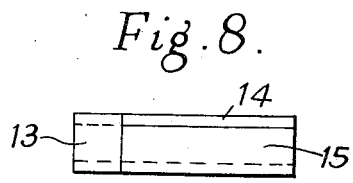

In order to assist in the understanding of the invention FIGURES 5, 6, 7 and 8 are provided these being, except for FIGURE 8, copied from the aforesaid copending specification. FIGURE 8 is similar to FIGURE 5 of said specification except that the long side folds are made in the opposite order to agree with the position of the folders in FIGURES 1 and 2.

If it is desired to fold in the manner shown in FIGURE 7 of said specification it is only necessary to position the levers 39 between the top and bottom ploughshare folders.

Referring now to FIGURES 10 and 11 these show apparatus operating in a generally similar manner to the apparatus described with reference to FIGURES 1 to 4 but having improved actuating devices. In this case a batch of cigarettes, indicated by a rectangle 60, is pushed through the machine by a pusher 61 fixed to a chain conveyor 62. A blank 6A, fed downwards, as shown, through a slot 63 in the machine bed 64 is cut from a web 6 which is fed by rollers 66, 67 from a reel (not shown). Cutting is effected by a knife 68 on a rotatable cutter bar 69, the knife cooperating with a fixed knife 70. The bar 69 carries two other knives 71 which make the short slits in the sides of the blank. The cut blank is guided downwards by a fixed guide 72 and a movable guide 73 pivoted at 74. As in the earlier construction the cigarette batch passes through a sleeve or mouthpiece before meeting the blank. This sleeve, marked 75, is of heavier construction than in the previous case but it has sharp edges which serve to crease the metal foil and save the ends of the cigarettes from being deformed by this work. The sleeve is attached to a bridge 76, fixed to a block 88 slidable on rods 77 and reciprocated by a lever 78 pivoted at 79 and operated by a cam 80 which engages a follower 81 on the lever which is pulled by a spring 82. The guide 73 is operated by the bridge movements through a pin and slot connection at 83.

The pieces of blank material 13 which are to form the side tucks are in this case bent out of the plane of the blank by pins 84 fixed in levers 85 which are rotatable on the shaft 86 of the cutter bar. Each lever 85 is operated in the following manner: A cam 87 is fixed to the shaft 86 and engages a roller 89 on a lever 90 fixed to a shaft 91 journalled in a frame 92. Another lever 93 is fixed to the shaft 91 and this lever is connected by a link 94 to the lever 85. As shown in FIGURE 10, the pins 84 have recently operated and the side tucks they have acted on are indicated at 13. As the blank starts to fold around the batch as the latter presses the blank between a top plate 95 and the machine bed 64 the guide 73 is swung back to the full line position so that the upper part of the blank can bend to the right, for the reasons previously given, and the pins 84 can therefore pass to the right to a position beyond the vertical path of the web, ready to move to the left and bend the pieces 13 of the next blank. The other guide 72 is the width of the article so that the pieces 13 can be folded sharply round its edges.

As the movement of the pins 84 bends the side tucks through 90° to the plane of the blank and so that they are in advance of the cigarette batch, the tuck material is able to move down through spaces between guides 97 and 98. Guides 97 are fixed to the top plate 95 and the guides 98 are integral with side guides 99 FIGURE 11, between the interior faces of which the tuck material 13 and the sides of the cigarette batch pass. The blank material extending laterally of the top face of the batch is folded down the sides of the batch by folders 100 and then the similar material at the bottom of the batch is folded upwards by folders 101 to lie on the folds made by the first said folded material. The tucks 13 are thereafter folded through 180° to be on the exterior of the sides of the wrapped batch by pins 102. These are fixed to levers 103 pivoted at 104 and having rollers 105. The rollers engage in slotted lugs 106 fixed to a bar 107 which is slidable on studs 108 as a link 109 operated by a bell crank lever pivoted at 110 moves to and fro. The bell crank lever has one arm 111 attached to the link 109 and the other arm 112 has a roller 113 on it which engages a cam 114. The action is such that as the article approaches the pins 102 they are much closer together than as shown in FIGURE 11 and when the leading end of the article, that is the base of the U of the wrapper almost contacts them they swing sharply outwards until they are spaced by the width of the article and operate to bend and smooth down the tucks 13 as previously explained. Their final outward position is as shown.

What we claim as our invention and desire to secure by Letters Patent is:

1. Apparatus for wrapping rectangular block-shaped articles by moving an article against a wrapper blank, provided with pairs of slits at each side spaced apart by the article thickness and extending from the edges of the blank to such distance that the two pairs are spaced apart by the width of the article to provide a flap at each side of the blank, said blank being positioned in the path of the article, whereby the blank is first folded into a U about the article by being moved between plates spaced apart by the article thickness, with the base of the U extending substantially between said slits, said apparatus comprising a guide channel for the blank to lead it into position in the path of the article, a finger movable at each side of the blank while in said guide channel to bend the said flap at that side through an angle with respect to the plane of the blank and in the direction of movement of the article, guides to retain the flaps in bent position and folding devices arranged, on continued movement of the article, to fold the blank into the said U, whereupon the said flaps project forward of the base of the U and lead the moving article and folded blank, and thereafter to fold the material extending laterally of the top and bottom faces of the article to form long side folds along the sides of the article.

2. Apparatus as claimed in claim 1 comprising operating devices for said fingers arranged to bend the portions of blank material between the slits at 90° to the plane of the blank and comprising cams for operating the fingers to move them from one face of the blank to the other and a guide plate for the blank of a width equal to article width whereby the said portions may be folded around the sides of said guide plate by the movement of the fingers to cause them to lie at 90° to the plane of the blank.

3. Apparatus as claimed in claim 2 comprising a pair of spaced plates at each side of the blank path and arranged to receive and retain the said portions at 90° to the plane of the blank.

4. Apparatus as claimed in claim 1 comprising operating devices for said fingers each consisting of a pivoted arm on which a finger is pivoted, a cam arranged to move said arm inwards towards the middle of the blank to bring the finger to a position in front of the blank such that finger movement will bend one said portion of the blank, an overcentre spring arranged to pull the finger against a stop and away from the blank and a lever attached to the finger and a fixed stop to engage said lever near the end of the inwards movement of said arm, whereby the spring rides over the pivot of the finger and causes the finger to spring into contact with said portion of the blank and bend it out of the plane of the blank.

5. Apparatus as claimed in claim 4 comprising a pair of spaced plates at each side of the blank path one of the plates of each pair comprising a helical folder whereby said bent portions are bent further to lie at 90° to the plane of the blank and are thereafter received and retained in bent condition by said spaced plates.

6. Apparatus claimed in claim 1 comprising a sleeve arranged to receive an article before the latter moves into contact with the blank and to engage the blank to define the folding lines whereby the leading end of the article is prevented from being damaged by the folding operation.

7. Apparatus as claimed in claim 1 comprising means for bending the said bent portions through 180° to cause them to lie on the sides of the partly wrapped article, said means consisting of movable pins positioned in the path of the advancing article and so that the bent portions pass outside of the pins, whereafter the pins are moved outwards until they are spaced apart by the width of the article and further movement of the article causes the said portions to be pressed on to the sides of the partly-wrapped article by said pins.

8. Apparatus as claimed in claim 7 comprising spring levers on which said pins are mounted so that the pins can be pushed aside by an advancing article and the levers moved outwards against spring tension until the article can pass in rubbing contact with the pins, whereby the said portions are pressed on to the sides of the partly wrapped article.

9. Apparatus as claimed in claim 8 comprising means for retaining the spring levers in the outward position until the partly-wrapped article has completely passed the pins and means for releasing the levers when the article has passed.

References Cited in the file of this patent

UNITED STATES PATENTS

| | | |
|---|---|---|
| 840,187 | Abbott | Jan. 1, 1907 |
| 2,486,892 | Sumida | Nov. 1, 1949 |